H. E. THOMPSON.
AWNING DEVICE.
APPLICATION FILED MAY 21, 1919.

1,346,351.

Patented July 13, 1920.
5 SHEETS—SHEET 1.

Witness
Inventor
H. E. Thompson,
by
T. G. Witherspoon
Attorney

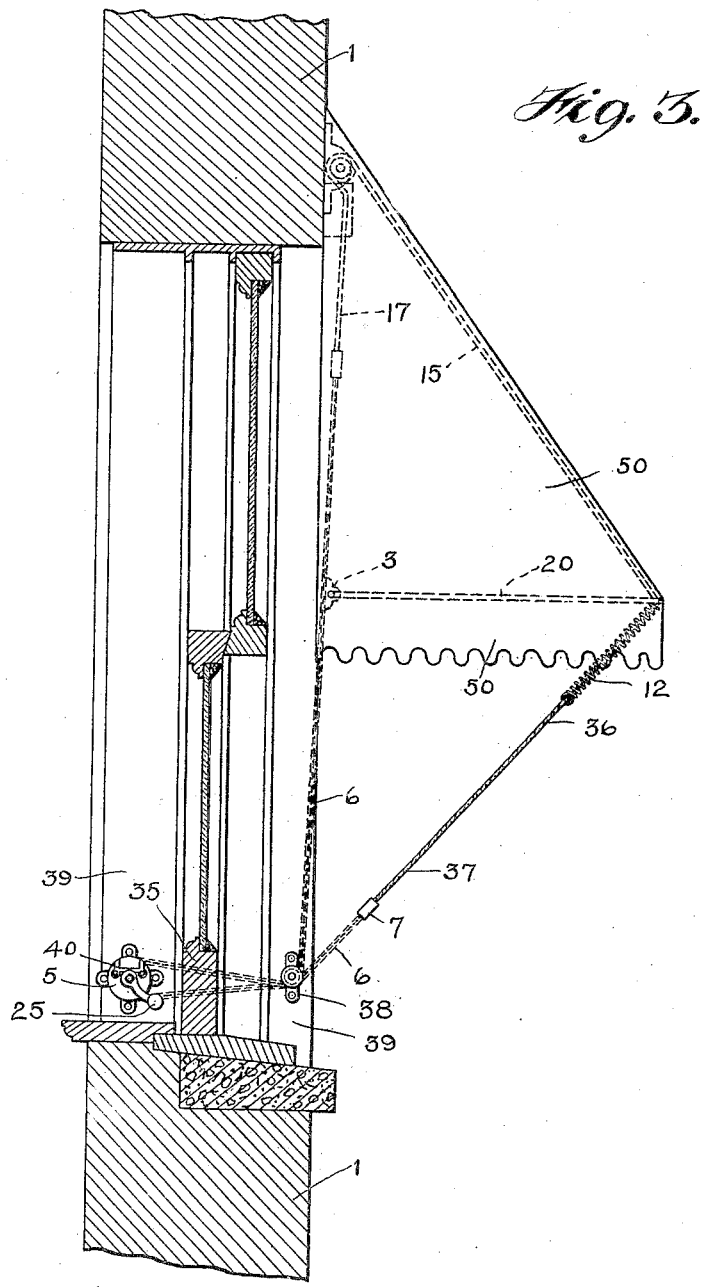

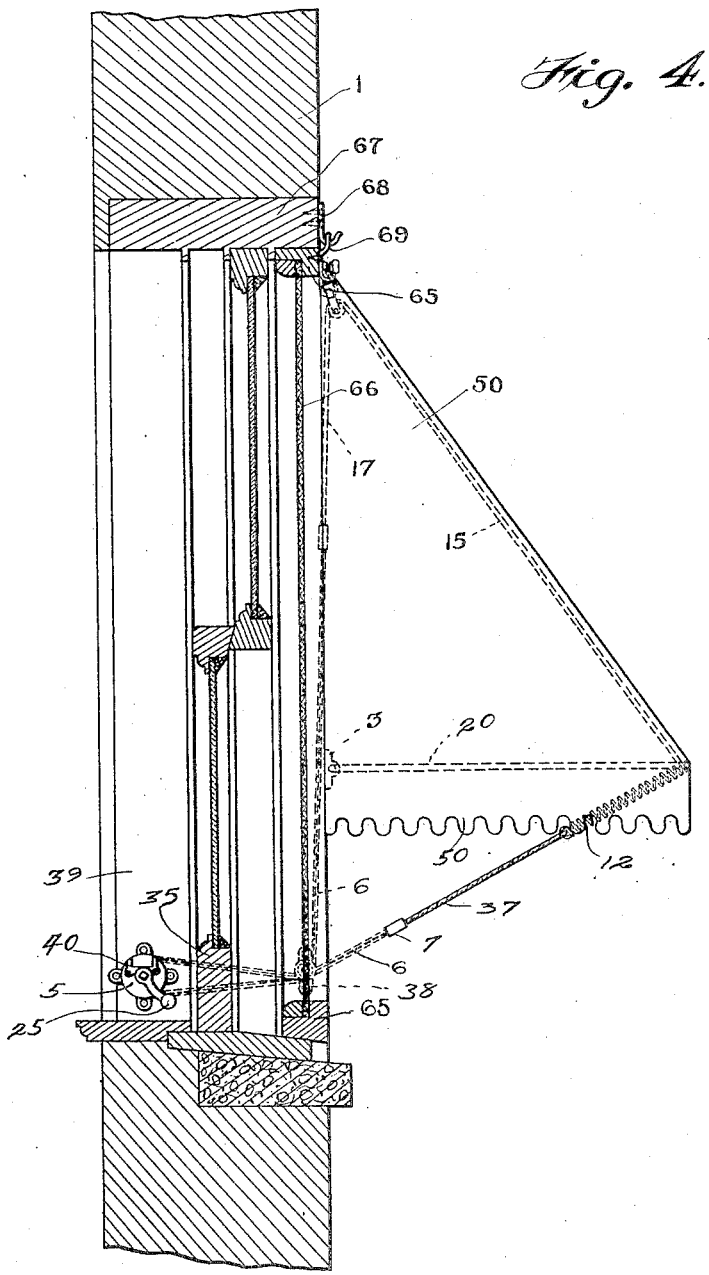

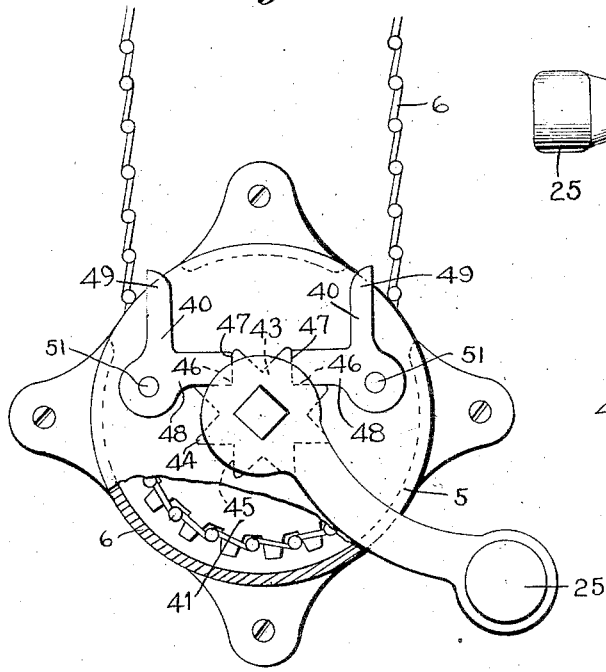
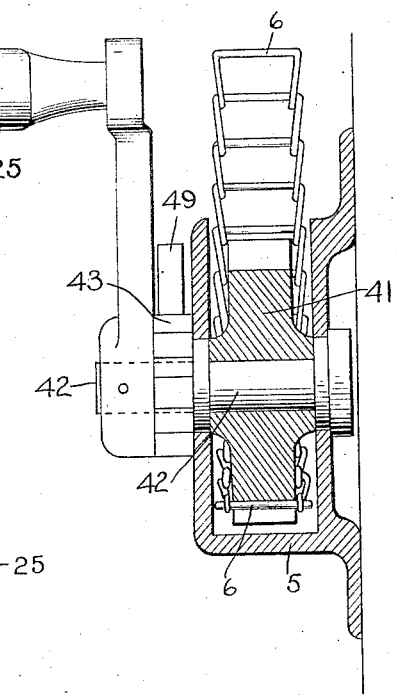
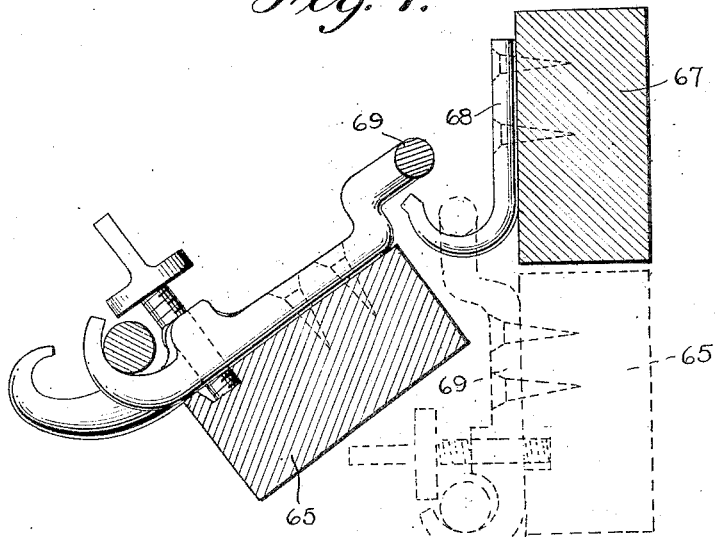

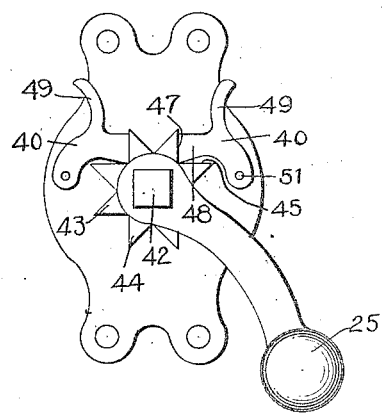
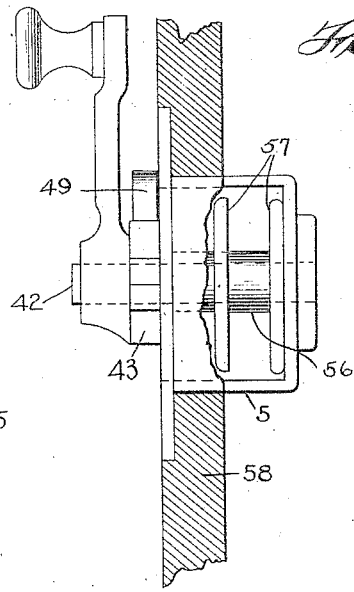
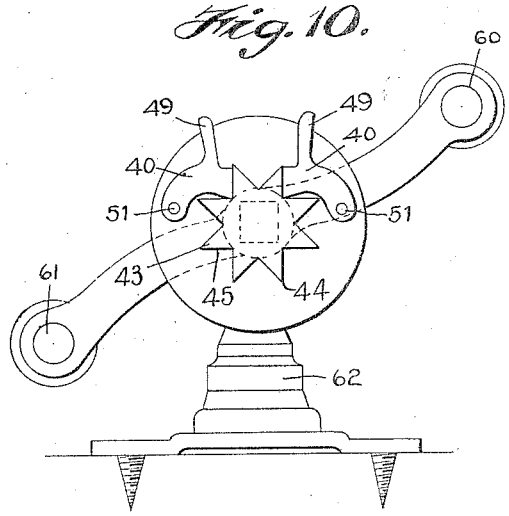
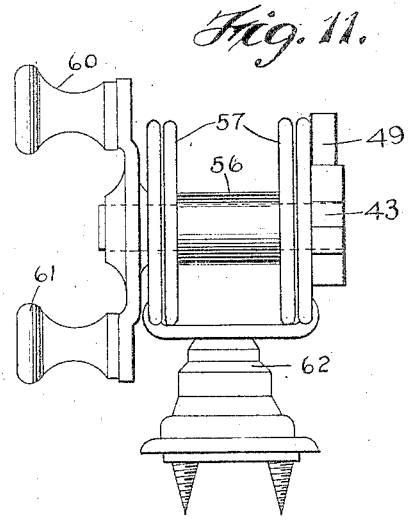

UNITED STATES PATENT OFFICE.

HENRY E. THOMPSON, OF NEWARK, NEW JERSEY.

AWNING DEVICE 1,346,351.  Specification of Letters Patent.  Patented July 13, 1920.

Application filed May 21, 1919. Serial No. 298,608.

*To all whom it may concern:*

Be it known that I, HENRY E. THOMPSON, a citizen of the United States, residing at Newark, in the county of Essex and State of New Jersey, have invented certain new and useful Improvements in Awning Devices; and I do hereby declare the following to be a full, clear, and exact description of the invention, such as will enable others skilled in the art to which it appertains, to make and use the same.

This invention relates to means for operating awning and other frames, and has for its object to provide a device which will be simple in construction, comparatively inexpensive to manufacture, and which will hold all of the running parts taut at all times, so that the creaking, flapping and other noises which are caused by the wind moving the present awning frames are entirely avoided.

With this and other objects in view, the invention consists in the novel details of construction, and combinations of parts more fully hereinafter disclosed and particularly pointed out in the claims.

Referring to the accompanying drawings forming a part of this specification in which like numerals designate like parts in all the views:—

Fig. 3 is a longitudinal sectional view through a window and frame, illustrating a further modified form of the invention here shown in elevation;

Fig. 4 is a view similar to Fig. 3 showing a still further modified form in which the awning is attached to a screen;

Fig. 5 is a front elevational view partly broken away illustrating the details of the hoisting devices illustrated in Figs. 1 to 3;

Fig. 6 is a central vertical sectional view of the parts shown in Fig. 5;

Fig. 7 is an enlarged detail sectional view of a portion of the parts shown in Fig. 4;

Fig. 8 is a front elevational view of a further modified form of hoisting device or reel, especially adapted to operate on opposite sides of the same wall;

Fig. 9 is a side elevational view partly broken away of the parts illustrated in Fig. 7, showing the same applied to a wall;

Fig. 10 is an end elevational view of a further modified form of reel; and

Fig. 11 is a side elevational view of the parts shown in Fig. 9.

Figure 1:
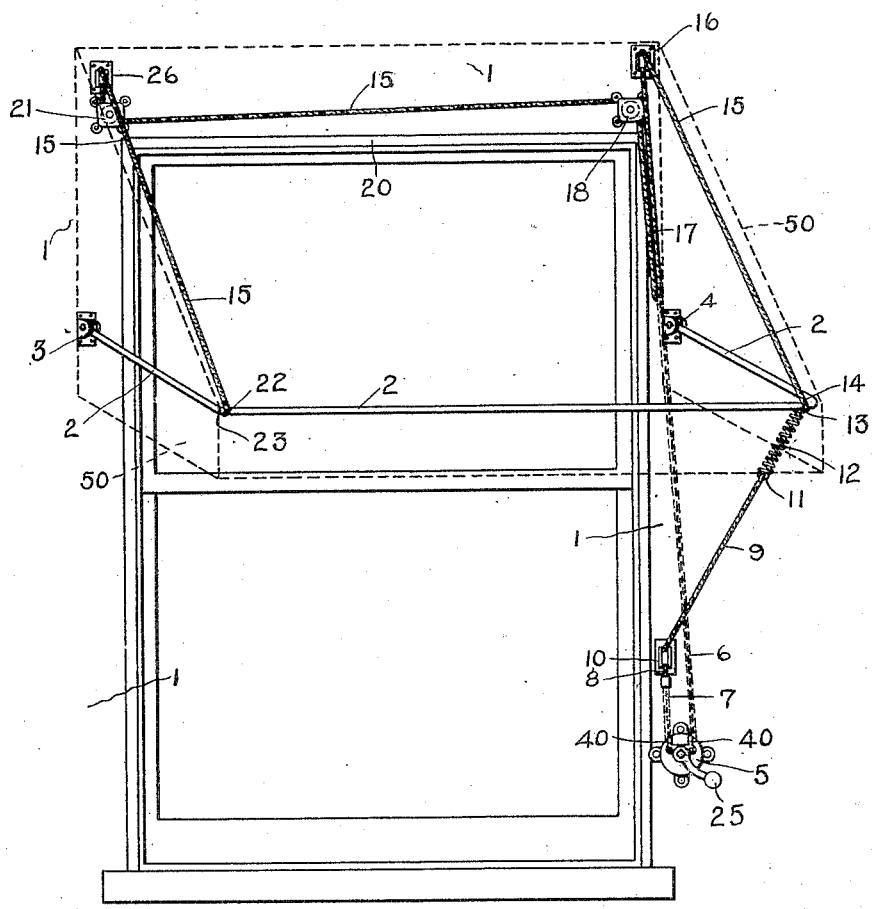
Figure 1 is a diagrammatic perspective view illustrating one form of my invention.

Referring more particularly to Fig. 1, 1 indicates the wall or other support to which the awning or other frame 2 is pivoted as at 3 and 4, and 50 indicates the awning (shown in dotted lines) extending over said frame 2. To the wall 1 is also attached the reel, or other hoisting device 5 under which conveniently passes the cord or chain 6, and one end 7 of said chain is attached to one end 8 of a cord 9 passing through the pulley or guide 10, likewise secured to said wall 1. The other end 11 of said cord 9, is attached to the spring 12, which is connected to the frame 2, as at 13. Likewise attached to said frame 2, as at 13, is one end 14 of a cord 15, passing through a pulley or guide 16, attached to said wall 1, then down from said pulley 16 to form a bight 17, and then up through a pulley 18 attached to said wall 1, at or near one corner of the window to be shaded. After leaving said pulley 18, the cord 15 runs along the upper edge 20, of the window and passes through a pulley 21, located at or near another corner of said window. After leaving the pulley 21, said cord 15 extends to the pulley 26 and frame 2, and its other end 22 is attached to said frame as at the point 23.

The operation of my means of hoisting awning and other frames will be clear from the foregoing, but may be briefly summarized as follows:—Upon turning the handle 25 of the hoisting device 5 in a clockwise direction, as seen in Fig. 1, the sprocket chain 6 will be pulled down, while its end 7 will be permitted to rise as seen in said figure. The downward travel of the chain or cord 6 will cause the bight 17 of the cord 15 to descend, and the ends 14 and 22 of said cord 15 to ascend. The upward movement of the said cord ends 14 and 22, of course, causes the awning 50 and frame 2 to be swung upwardly on the pivots 3 and 4, and to be positioned snugly against the wall 1. But one of the important features of my invention resides in the spring 12 and its coacting connections. When the frame 2 is in its down position as shown in Fig. 1, said spring serves to hold the chain 6 and cord 15 taut, so that no slack is any where possible, and when the awning and frame are lifted into the position just described against the wall 1, said spring 12 likewise holds all running parts taut so that no slack is possible.

A little consideration will show that in every position of the parts, even when the awning is partially hoisted, the said spring 12 likewise serves to eliminate all slack, and therefore, effectually prevents the awning from flapping, creaking or making disturbing noises when the wind is blowing, no matter how it may have been adjusted.

Figure 2:
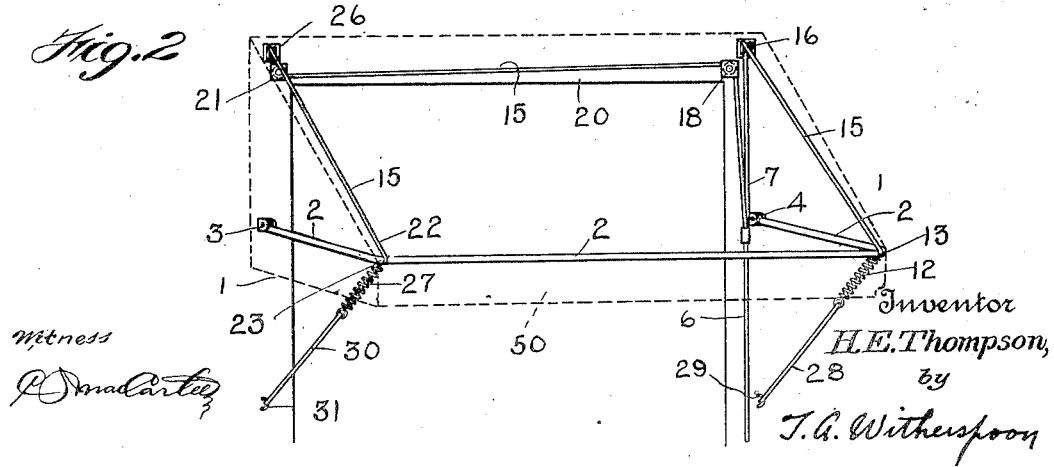
Fig. 2 is a view similar to Fig. 1, showing a slightly modified form of the invention.

In the modified form of the invention shown in Fig. 2, the parts appearing in Fig. 1 are designated by the same numerals, but instead of attaching the end 7 of the cord 6 to the spring 12 as in Fig. 1, I provide an extra cord or connection 28, attach the same to said spring and to the wall 1 as at 29. At the point 23 on said frame 2, I likewise attach another spring 27, attach to said spring the extra cord 30, and likewise connect said cord 30 to the wall 1, as at 31.

It will be clear that the springs 12 and 27 in Fig. 2 will likewise serve to at all times hold the running parts taut and prevent the awning flapping, creaking, etc., as disclosed in connection with Fig. 1.

In the form of invention shown in Fig. 3, the hoisting means is located inside the window frame 35. One end 36 of the cord 37 is attached to the spring 12, which is attached as shown to the frame 2, and the end 7 of the sprocket chain 6 is attached to the other end of said cord 37. The chain 6 passes through one side of a double pulley 38 conveniently located on the window frame 39, around the hoisting device 5 also conveniently located on said frame 39, then through the other side of said pulley 38, and is joined to the bight 17 of the hoisting cord 15, which latter is rove through the various pulleys and is attached to the frame 2 in the same manner as has been disclosed in connection with the Figs. 1 and 2.

The form of the invention shown in Fig. 4 is substantially the same as that just described in connection with Fig. 3, except that the awning 50, instead of being directly attached to the wall 1, is detachably secured to the frame 65 of a screen 66, which in turn is removably mounted in the window frame 67 as by means of the hook 68 and eye member 69, see Fig. 7. In order however, that the spring 12 may operate with certainty, it is of course necessary to prevent the hoisting device 5 from accidentally turning in either direction, and to accomplish this, I provide said device 5 with the automatic holding dogs 40, and preferably otherwise construct the same as will now be disclosed, reference being had more especially to Figs. 5, 6, 9, 10 and 11. In Figs. 5 and 6, the hoisting device or casing 5 is provided with a sprocket 41, mounted on the spindle 42, and around which fits the sprocket chain 6. To the spindle 42 is fitted the handle 25, and between the said handle and casing is located the star, or stop, wheel 43, which is rigid with the handle, and the teeth 44 of which are provided with the straight walls or sides 45, making right angles with each other.

Coacting with said walls 45 are the right angular disposed sides 46 and 47, of the holding members 48, of the dogs 40. Said dogs 40 are further provided with the finger holds 49, by which they may be turned on their pivots 51, to disengage the teeth 44.

In order that the holding members 48 may readily disengage said teeth 44, the parts are so proportioned and disposed that if the flat surfaces 46 when in engagement with flat surfaces or walls 45 on the teeth, are prolonged they will pass through the pivots 51, so that it follows if said finger holds 49 are moved outwardly, or away from each other, the said surfaces 46 and 47 will readily leave the walls 45 of their respective teeth and free the star wheel 43 and handle 25. On the other hand, said locking members 48 being heavier than said members 49, they will readily fall back into their locking positions shown in Fig. 5, when the handle 25 is stationary.

It therefore follows that the holding dogs 40 will prevent the sprocket wheel 41 from moving accidentally and therefore will prevent the running parts of the invention from being slacked off and the frame loosened through accident.

In the modified form of reel shown in Figs. 8 and 9, the parts appearing in Figs. 5 and 6 have received the same reference characters, but in these said Figs. 7 and 8, I omit the sprocket wheel 41. I further locate the pivots 51 of the holding dogs 40 below the holding walls 45 of the teeth so that a single holding surface 47 of the holding members 48 is sufficient, and so that said surface 47 may readily leave its coacting tooth wall 45.

Instead of the sprocket wheel 41, I provide the drum member 56, and mount it on the spindle 42 instead of said sprocket wheel 41, as will be clear from Fig. 9. I also provide the two disks or flanges 57 for holding the cord or chain that may be wound on the drum member 56, away from the walls of the casing 5 as will be readily understood. This particular form of the invention is further well adapted for extending through a wall such as 58 and permitting the handle 25 to be operated inside the room instead of outside. In other words, this particular form of reel is adapted for use in connection with the type of invention disclosed in Figs. 3 and 4.

In Figs. 10 and 11, I have illustrated a still further modified form of reel which is adapted to be placed on almost any wall or support, which extends at right angles to the operating handles 60 and 61. The frame for supporting the drum member 56 is U-shaped and therefore somewhat similar to the frame 5, but its support 62 extends at right angles to said frame as illustrated. Otherwise this said form of invention may be considered as substantially the same, as the form shown in Figs. 8 and 9.

It will now be clear that my invention is adapted for all sorts of awning frames, no matter where they may be located, and that by employing one or the other form of reel, the manipulation of said awning frame may be from almost any convenient point desired. It is therefore obvious that those skilled in the art may vary the details of the invention as well as the arrangement of parts without departing from the spirit of the invention, and therefore I do not wish to be limited to the above disclosure except as may be required by the claims.

What I claim is:

1. In a device of the class described the combination of a vertically swinging awning frame; a cord having its ends secured in spaced relation to said frame and provided with a bight between said ends; suitable guides for said cord; a flexible connection joined at one end to said bight; a rotatable hoisting means for moving said connection and bight provided with a locking device; a spring connected to said frame; and a connection with said spring adapted to hold said flexible connections and cord taut at all times and thereby prevent said frame from being rocked by the wind, substantially as described.

2. In a device of the class described the combination of a vertically swinging awning frame; a cord having its ends secured to opposite sides of said frame and provided with a bight between said ends adapted to hoist said frame; a flexible connection joined at one end to said bight; a rotating hoisting device around which said connection passes; a spring connected at one end to the other end of said flexible connection and joined at its own other end with said frame; and means for positively locking said hoisting device against movement in either direction, substantially as described.

3. In a device of the class described the combination of an awning frame; a cord having a bight adapted to hoist said frame located on the outside of a building; a flexible connection joined at one end of said bight; a rotating hoisting device located on the inside of said building around which said connection passes; suitable pulleys for guiding said cord and flexible connection; a spring connected at one end to the other end of said flexible connection and joined at its own other end with said frame; and means for positively locking said hoisting device against movement in either direction, substantially as described.

4. In a hoisting means for awning frames, the combination of a spindle; means on said spindle for receiving and moving a flexible connection; a handle for turning said spindle; a locking star wheel rigid with said handle the adjacent walls of any two adjacent teeth of the said wheel being at right angles to each other; and a pair of opposed gravity dogs for positively engaging a pair of said teeth and thereby preventing said handle from turning in either direction, substantially as described.

5. In a hoisting means for awning frames, the combination of a spindle; means comprising a sprocket wheel on said spindle for receiving and moving a flexible connection; a handle for turning said spindle; a locking star wheel rigid with said handle the adjacent walls of any two adjacent teeth of the said wheel being at right angles to each other; and a pair of opposed gravity dogs having finger holds for moving the same in opposite directions, and having a pair of weighted holding members for positively engaging a pair of said teeth and thereby preventing said handle from turning in either direction, substantially as described.

In testimony whereof I affix my signature in presence of two witnesses.

HENRY E. THOMPSON.

Witnesses:
ALBERT E. SHEPARD,
HERMAN P. WOLFF.